(12) United States Patent
Todescato et al.

(10) Patent No.: US 10,795,552 B2
(45) Date of Patent: Oct. 6, 2020

(54) AVIONICS DEVICE AND METHOD FOR SENDING A DATA MESSAGE TO AT LEAST ONE RECEIVING ELECTRONIC DEVICE, RECEIVING ELECTRONIC DEVICE, ASSOCIATED RECEIVING METHOD AND COMPUTER PROGRAM

(71) Applicant: THALES, Courbevoie (FR)

(72) Inventors: Isabelle Todescato, Merignac (FR);
Jean-Jérôme Vengeon, Merignac (FR);
Stéphane Roulon, Merignac (FR);
Ludovic Billault, Merignac (FR)

(73) Assignee: THALES, Courbevoie (FR)

( * ) Notice: Subject to any disclaimer, the term of this patent is extended or adjusted under 35 U.S.C. 154(b) by 92 days.

(21) Appl. No.: 16/195,252

(22) Filed: Nov. 19, 2018

(65) Prior Publication Data

US 2019/0155467 A1 May 23, 2019

(30) Foreign Application Priority Data

Nov. 21, 2017 (FR) ..................................... 17 01209

(51) Int. Cl.
*G06F 3/0484* (2013.01)
*G08G 5/00* (2006.01)
(Continued)

(52) U.S. Cl.
CPC ........... *G06F 3/0484* (2013.01); *B64D 43/00* (2013.01); *G06F 3/0481* (2013.01); *G06F 3/14* (2013.01); *G06F 3/147* (2013.01); *G06F 3/1454* (2013.01); *G08G 5/0013* (2013.01); *G08G 5/0021* (2013.01); *G09G 5/14* (2013.01);
(Continued)

(58) Field of Classification Search
USPC ........................................................... 701/3
See application file for complete search history.

(56) References Cited

U.S. PATENT DOCUMENTS

| 7,941,248 B1 * | 5/2011 | Tsamis | G08G 5/0013 701/3 |
| 9,008,868 B1 * | 4/2015 | Bantoft | B64C 19/00 701/3 |

(Continued)

OTHER PUBLICATIONS

Lefebvre, Yannick, et al.; "Mastering the ARINC 661 Standard"; PRESAGIS Workshop (2011); 1-23.
French Search Report dated Aug. 3, 2018.

*Primary Examiner* — Tyler D Paige
(74) *Attorney, Agent, or Firm* — Duane Morris LLP

(57) ABSTRACT

This avionics device intended to be on board an aircraft is configured to implement an avionics function and to control the display, by at least one receiving device, of data associated with the avionics function, the avionics function including one or several avionics commands able to be displayed on the receiving device and selected by a user.
The avionics device comprises a module for generating a data message, and a module for sending said message to the receiving device.
The generating module is configured to generate a usage domain message containing a list of avionics command(s) available for the corresponding avionics function, and the sending module is configured to send the usage domain message to the receiving device, to display the availability of the only command(s) included in said list.

12 Claims, 3 Drawing Sheets

(51) Int. Cl.

| | |
|---|---|
| *H04L 29/06* | (2006.01) |
| *G06F 3/147* | (2006.01) |
| *B64D 43/00* | (2006.01) |
| *G06F 3/14* | (2006.01) |
| *H04L 29/08* | (2006.01) |
| *G06F 3/0481* | (2013.01) |
| *G09G 5/14* | (2006.01) |

(52) U.S. Cl.
CPC .............. *H04L 67/12* (2013.01); *H04L 67/38* (2013.01); *G09G 2380/12* (2013.01)

(56) References Cited

U.S. PATENT DOCUMENTS

| | | | |
|---|---|---|---|
| 9,060,010 | B1 | 6/2015 | McCusker et al. |
| 9,714,081 | B1* | 7/2017 | Hall, III ................ G06F 3/1423 |
| 2012/0036445 | A1 | 2/2012 | Ganille et al. |
| 2013/0232237 | A1* | 9/2013 | Zulch, III ............... H04L 67/12 |
| | | | 709/220 |
| 2015/0298816 | A1* | 10/2015 | Ouellette ............... B64D 45/00 |
| | | | 701/3 |
| 2016/0260265 | A1* | 9/2016 | Buehler ............. H04B 7/18506 |
| 2017/0075503 | A1 | 3/2017 | Chakra et al. |
| 2017/0075558 | A1* | 3/2017 | Shapiro ................... G09G 5/38 |
| 2018/0182250 | A1* | 6/2018 | Bonnet ................ G08G 5/0013 |
| 2018/0233111 | A1* | 8/2018 | Leconte ................. H04L 67/08 |
| 2019/0114906 | A1* | 4/2019 | Deseure ................ B64D 45/00 |
| 2019/0155467 | A1* | 5/2019 | Todescato ............... G06F 3/14 |
| 2019/0389565 | A1* | 12/2019 | Lissajoux .............. G08G 5/025 |

* cited by examiner

AVIONICS DEVICE AND METHOD FOR SENDING A DATA MESSAGE TO AT LEAST ONE RECEIVING ELECTRONIC DEVICE, RECEIVING ELECTRONIC DEVICE, ASSOCIATED RECEIVING METHOD AND COMPUTER PROGRAM

CROSS-REFERENCE TO RELATED APPLICATIONS

This application is a U.S. non-provisional application claiming the benefit of French Application No. 1701209, filed on Nov. 21, 2017, which is incorporated herein by reference in its entirety.

FIELD OF THE INVENTION

The present invention relates to an avionics device intended to be on board an aircraft, the avionics device being configured to implement an avionics function and to control the display, by at least one receiving electronic device, of data associated with the avionics function, the avionics function including one or several avionics commands able to be displayed on the receiving device and selected by a user.

The avionics device comprises a generating module configured to generate a data message, and a sending module configured to send the generated message to the receiving device.

The present invention also relates to a method for sending a data message to at least one electronic receiving device, the method being implemented by such an avionics device.

The present invention also relates to an electronic receiving device configured to receive a data message from such an avionics device.

The present invention also relates to a method for receiving a data message from such an avionics device, the receiving method being implemented by such an electronic receiving device.

The invention also relates to a non-transitory computer-readable medium including a computer program including software instructions which, when executed by a computer, implement such a sending method or such a receiving method.

The present invention relates to the field of data communication and functional interfacing through an avionics network between an avionics device intended to be on board an aircraft and one or several receiving devices that are not necessarily on board the aircraft. The avionics device is said to be functional while being configured to implement an avionics function. The avionics device is for example a flight management system (FMS), a radio management system (RMS), a terrain awareness and warning system (TAWS), a weather radar system, and avionics interface system (AIS), or a mission preparation system. The receiving device is for example a cockpit display system (CDS) or a head-up display (HUD), or an electronic flight bag (EFB). One skilled in the art will note that alternatively, the receiving device is a device implementing another avionics function. The invention then for example relates to an exchange of data between a flight management system, or FMS, and a radio management system, or RMS.

BACKGROUND

Communication networks are known according to the ARINC 661 protocol or the ARINC 739 protocol. These ARINC 661 and ARINC 739 protocols make it possible to support the interface between a functional avionics device and a display device. With the ARINC 661 protocol, the exchanges are done on graphic objects that are hosted in the display device and controlled functionally by the functional avionics device. With the ARINC 739 protocol, the exchanged information is key presses and characters to be displayed. With the ARINC 661 and ARINC 739 protocols, the display of the data is therefore controlled entirely by the functional avionics device, the display device—here forming the client device or receiving device—serving solely to follow the display instructions from the functional avionics device.

However, such communication protocols are not suitable when the management of the display, and more generally of the man-machine interface, must be done at least partially by the receiving device, or when the man-machine interface must be managed independently of the avionics function.

SUMMARY

The aim of the invention is then to propose an avionics device and an associated sending method that make it possible to improve the coupling between the avionics device and the receiving device(s).

To that end, the invention relates to an avionics device of the aforementioned type, wherein the generating module is configured to generate a usage domain message containing a list of avionics command(s) available for the corresponding avionics function, and the sending module is configured to send the usage domain message to the receiving device, to display the availability of the only command(s) included in said list.

The avionics device according to the invention is then configured to send the receiving device(s) the usage domain message containing the list of avionics command(s) available for the corresponding avionics function, in order to allow the receiving device(s) to determine and display, in particular for the user, the availability of command(s) for only the command(s) included in said list.

The knowledge, by the receiving device(s), of the usage domain of the avionics function implemented by the avionics device then makes it possible to improve the coupling between the avionics device and the receiving device(s).

According to other advantageous aspects of the invention, the avionics device comprises one or more of the following features, considered alone or according to all technically possible combinations:

- the usage domain message further contains a range of authorized value(s) for a parameter associated with an available avionics command;
- the usage domain message further contains an unavailability status for an avionics command unavailable for the corresponding avionics function;
- the usage domain message further contains an unavailability pattern for said unavailable avionics command;
- in response to a data provision request, sent by the receiving electronic device, the generating module is configured to generate an acknowledgment message containing a minimum condition for provision of the requested data, the requested data being available for the receiving device in another data message received from the avionics device once the minimal provision condition is verified;
- the avionics device further comprises a subscription management module configured, in response to a subscription request sent by the receiving electronic device, to regularly send the receiving device one or several data packets corresponding to a list of requested packet(s), the subscription request including said list of requested packet(s);

the subscription management module is configured, following each update of a packet of said list, to send the receiving device the updated data packet;

the minimum provision condition is chosen from among the group consisting of: a minimum moment in time and a minimum value of an indicator; and the subscription management module is configured, during a predefined time period, to send each data packet from the list to the receiving device at least once.

The invention also relates to a method for sending a data message to at least one receiving electronic device, the method being implemented by an avionics device intended to be on board an aircraft, the avionics device being configured to implement an avionics function and to control the display, by the receiving electronic device, of data associated with the avionics function, the avionics function including one or several avionics commands able to be displayed by the receiving device and selected by a user, the sending method comprising the following steps:
generating a data message, and
sending the generated data message to the receiving device,
the generating step including generating a usage domain message containing a list of avionics command(s) available for the corresponding avionics function, and
the sending step including sending the usage domain message to the receiving device, to display the availability of the only command(s) included in said list.

The invention also relates to a receiving electronic device configured to receive a data message from an avionics device intended to be on board an aircraft, the avionics device being able to implement an avionics function and to control the display, via the receiving electronic device, of data associated with the avionics function, the avionics function including one or several avionics commands able to be displayed by the receiving device and selected by a user, the electronic receiving device comprising:
a receiving module configured to receive a message from the avionics device, and
a processing module configured to process each received message,
the receiving module being configured to receive, from the avionics device, a usage domain message containing a list of avionics command(s) available for the corresponding avionics function, and
the processing module being configured to control the display, on a display screen, of the availability of the only command(s) included in said list contained in the received usage domain message.

The invention also relates to a method for receiving a data message from an avionics device intended to be on board an aircraft, the avionics device being able to implement an avionics function and to control the display, via the receiving electronic device, of data associated with the avionics function, the avionics function including one or several avionics commands able to be displayed by the receiving device and selected by a user, the receiving method being implemented by a receiving electronic device and comprising the following steps:
receiving a message from the avionics device, and
processing each received message,
the receiving step including receiving a usage domain message, sent by the avionics device, the usage domain message containing a list of avionics command(s) available for the corresponding avionics function, and the processing step including controlling the display, on a display screen, of the availability of the only command(s) included in said list contained in the received usage domain message.

The invention also relates to a non-transitory computer-readable medium including a computer program including software instructions which, when executed by a computer, implement a sending method or a receiving method as defined above.

BRIEF DESCRIPTION OF THE DRAWINGS

These features and advantages of the invention will appear more clearly upon reading the following description, provided solely as a non-limiting example, and done in reference to the appended drawings, in which.

DETAILED DESCRIPTION

Figure 1:
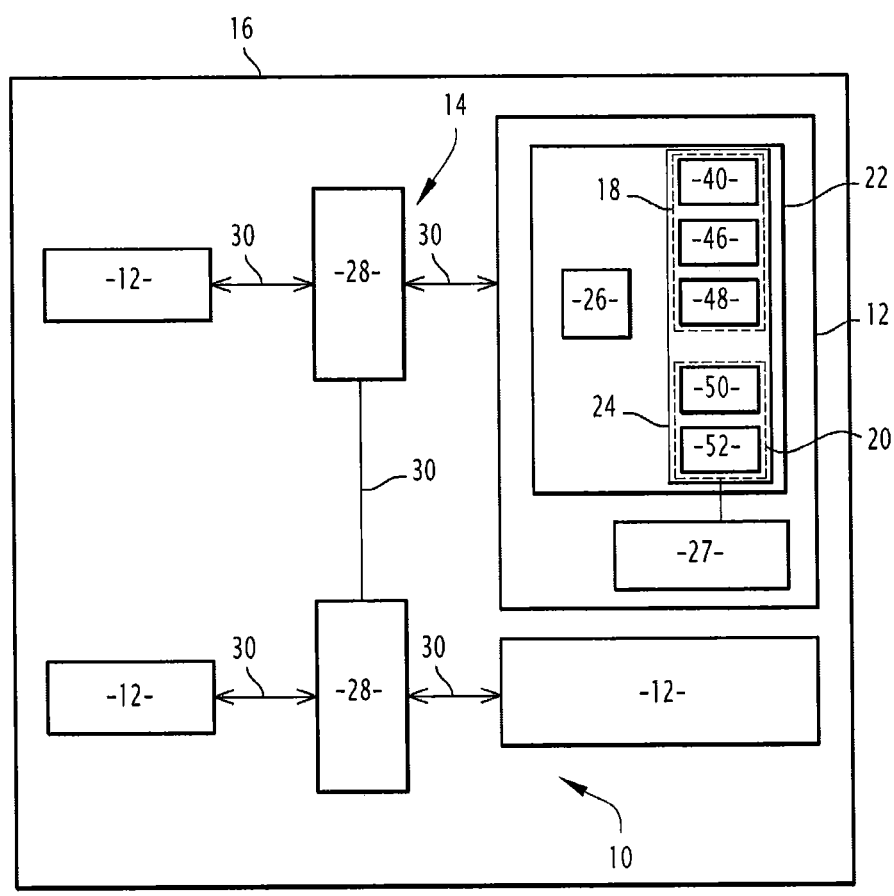
FIG. 1 is a schematic illustration of a communication system comprising at least two items of electronic equipment connected to one another by an avionics communication network, at least one of the electronic equipment items including an avionics device according to the invention.

FIG. 1 shows a communication system 10 including at least two items of electronic equipment 12 connected to one another by an avionics communication network 14, such as an Ethernet communication network. At least one of the electronic equipment items 12 and the avionics communication network 14 is on board an aircraft 16. The aircraft 16 is preferably an airplane. Alternatively, the aircraft 16 is a helicopter, or a drone piloted remotely by a pilot.

The communication system 10 includes several pieces of electronic equipment 12, such as avionics equipment like in the example of FIG. 1, where the communication system 10 is on board the aircraft 16.

The communication system 10 comprises an avionics sending device 18 and at least one electronic receiving device 20 connected to one another by the avionics communication network 14. The avionics sending device 18 is on board the aircraft 16 and the receiving device(s) 20 are not necessarily on board the aircraft.

In the example of FIG. 1, the avionics sending device 18 and the receiving device 20 are arranged within a same electronic equipment item 12.

In an alternative that is not shown, the avionics sending device 18 is arranged within a first electronic equipment item 12 and the receiving device 20 is arranged within a second electronic equipment item 12 separate from the first electronic equipment item 12.

Also alternatively, the receiving device 20 is an electronic device outside a secure communication domain within the aircraft 16, this receiving device 20 for example being a device outside the aircraft 16, such as an electronic device installed on the ground. This outside receiving device 20 is then connected to each other device of the communication system 10 via a communication gateway, not shown, on board the aircraft 16 and connected to the avionics communication network 14. The domain outside this secure communication gateway is also called open world. The outside receiving device 20 then belongs to the open world, and the communication gateway, which is a secure gateway, in particular including a firewall, provides the interface between the secure domain and the open world.

In the example of FIG. 1, each electronic equipment item 12 includes an information processing unit 22, for example made up of a memory 24 associated with a processor 26.

In the example of FIG. 1, the electronic equipment item 12 that includes the avionics sending device 18 and the receiving device 20 further comprises a display screen 27, also called viewing screen.

In the example of FIG. 1, a single electronic equipment item 12 is shown in detail with the different devices and modules that it contains, in order to simplify the drawing.

The avionics communication network 14 comprises at least one network switch 28 and at least one two-way link 30, each network switch 28 being connected to one or several electronic equipment items 12 via respective two-way links 30. The avionics communication network 14 preferably comprises several network switches 28, like in the example of FIG. 1, where the avionics communication network 14 comprises two network switches 28 connected to one another by a two-way link 30.

One skilled in the art will understand that, when the avionics communication network 14 is an Ethernet communication network, each network switch 28 is an Ethernet network switch, and each two-way link 30 is an Ethernet two-way link.

As an optional addition, the avionics communication network 14 is a redundant communication network and includes at least two independent elementary networks, redundant with respect to one another. In this case, two electronic equipment items 12, a source equipment item and a receiving equipment item, communicate via at least two independent elementary networks.

Each avionics sending device 18 is configured to implement an avionics function and to control the display, by at least one receiving electronic device 20, of data associated with the avionics function, the avionics function including one or several avionics commands able to be displayed on the receiving device 20 and selected by a user.

An avionics function refers to a function to aid piloting of the aircraft 16, in particular in the airspace, such as a flight management function, a navigation radio management function, a collision avoidance function, a weather function, an onboard information function, or a mission preparation function.

One skilled in the art will then understand that when the avionics function implemented by the avionics device 18 is a flight management function, respectively navigation radio function, a collision avoidance function, a weather function, an onboard information function, or a mission preparation function, the avionics device 18 is then for example a flight management system (FMS), respectively a radio management system (RMS), a terrain awareness and warning system (TAWS), a weather radar system, an onboard information system, such as an avionics interface system (AIS), or a mission preparation system.

An avionics command refers to a command interacting with the avionics function.

The avionics command is for example a consultation command, i.e., a command allowing a receiving device 20, or client, to consult an element of an avionics function. For the terrain anti-collision function implemented by the terrain awareness and warning system (TAWS), the consultation command for example makes it possible to consult the information on a particular obstacle; for the flight management function implemented by the flight management system (FMS), the consultation command for example makes it possible to consult the information on an airport managed in a user database of the flight management system.

As an additional example, the avionics command is a change command, i.e., a command allowing a receiving device 20, or client, to modify a state of the avionics function. For the navigation radio management function implemented by the radio management system (RMS), the change command is for example a command to launch self-test(s) of a radio receiver; for the flight management function implemented by the flight management system (FMS), the change command is for example a command to activate a temporary flight plan; for the weather function for example implemented by the weather radar system, the change command is for example an alert mode change command.

As still another additional example, the avionics command is a computation command, i.e., a command allowing a receiving device 20, or client, to request a particular computation from the avionics function. For the flight management function implemented by the flight management system (FMS), the computing command is for example a command to compute a magnetic breakdown at a point of the globe.

As still another additional example, the avionics command is a creation command, i.e., a command allowing a receiving device 20, or client, to request a creation, from the avionics function, such as the creation of a new airport in a user database for the flight management system.

As still another additional example, the avionics command is an activation command, i.e., a command allowing a receiving device 20, or client, to request an activation, from the avionics function, such as the activation of the self-test of a TACAN receiver for the radio management system (RMS).

Each avionics sending device 18 is further configured to send, to the electronic receiving device(s) 20, at least one data message, such as a usage domain message 36.

Each avionics sending device 18 comprises a generating module 40 configured to generate a respective data message, the message for example being the usage domain message 36 containing a list of avionics command(s) available for the corresponding avionics function.

Each avionics sending device 18 comprises a sending module 46 configured to send the generated message to the receiving device(s) 20.

As an optional addition, each avionics sending device 18 further comprises a subscription management module 48 configured, in response to a subscription request sent by the receiving electronic device 20, to regularly send the receiving device 20 one or several data packets corresponding to a list of requested packet(s), the subscription request including said list of requested packet(s).

Each electronic receiving device 20 is configured to receive data, in particular data messages, via the communication network 14.

Each receiving device 20 comprises a receiving module 50 configured to receive, via the communication network 14, at least one data message, in particular the usage domain message 36, and a processing module 52 configured to process each received message.

In the example of FIG. 1, the display screen 27 is separate from the receiving device 20, while being directly connected to the receiving device 20, the receiving device 20 controlling, for example via its processing module 52, the display of the data on the display screen 27, in particular that contained in a message received by the receiving module 50.

In an alternative that is not shown, the display screen 27 is incorporated into the receiving device 20.

In the example of FIG. 1, on the one hand, the generating module 40, the sending module 46, as well as, optionally and additionally, the subscription management module 48, and on the other hand, the receiving module 50 and the processing module 52, are each made in the form of software executable by the processor 26. The memory 24 is then able to store generating software configured to generate a respective data message, the message for example being the usage domain message 36 containing a list of avionics command(s) available for the corresponding avionics function, sending software configured to send the generated message to the receiving device(s) 20. As an optional addition, the memory 24 is able to store subscription management software configured, in response to a subscription request sent by the receiving device 20, to regularly send the receiving device 20 one or several data packets corresponding to the list of requested packet(s) included in said request. The memory 24 is also able to store receiving software configured to receive, via the communication network 14, at least one data message, in particular the usage domain message, and processing software configured to process each received message, and in particular the usage domain message. The processor 26 of the information processing unit 22 is then able to execute the generating software and the sending software, as well as, optionally and additionally, the subscription management software, in the case of the sending device 18, or to execute the receiving software and the processing software in the case of the receiving device 20.

In an alternative that is not shown, on the one hand, the generating module 40, the sending module 46, as well as, optionally and additionally, the subscription management module 48, and on the other hand, the receiving module 50 and the processing module 52, are each made in the form of a programmable logic component, such as an FPGA (Field Programmable Gate Array), or in the form of a dedicated integrated circuit, such as an ASIC (Application Specific Integrated Circuit).

The usage domain message 36 includes the list of avionics command(s) available for the corresponding avionics function.

Optionally and additionally, the usage domain message 36 further contains a range of authorized value(s) for a parameter associated with an available avionics command.

The authorized value range is for example in one of the following forms;
- an authorized value range between a minimum value and a maximum value, for example when the parameter is a physical property, such as an altitude;
- a set of authorized values between a minimum value and a maximum value with an increment between two successive authorized values, for example when the parameter is a physical property, such as an altitude;
- a set of authorized characters;
- a set of authorized identifiers; and
- an optional or non-optional state of the parameter.

Also additionally, the usage domain message 36 further contains an unavailability status for an avionics command unavailable for the corresponding avionics function. The usage domain message 36 preferably also contains an unavailability pattern for said unavailable avionics command.

Figure 3:
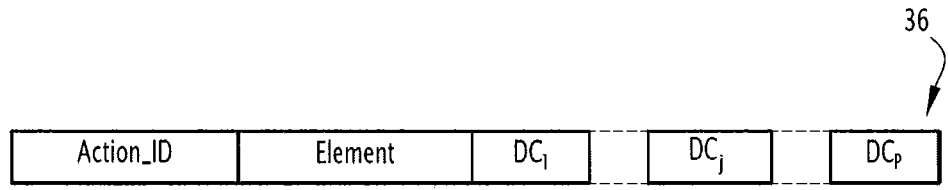
FIG. 3 is a schematic view illustrating the structure of a usage domain message sent by the electronic transmitting device according to the invention.

In the example of FIG. 3, the usage domain message 36 comprises a functional header, made up of an identical field of the action type Action_ID (from Action IDentifier) and an element field Element containing the element to which the action relates, and one or several Data Clusters DC. Each cluster DC is associated with an index j, with a value comprised between 0 and P, where P is an integer greater than or equal to 0 representing the number of cluster(s) included in the usage domain message 36.

One skilled in the art will understand that the index j is equal to 0, when the associated avionics command has no parameter, and that the usage domain message 36 then does not include a cluster DC and comprises only the functional header, with the identification field of the action type Action_ID and the element field Element. An avionics command not including a parameter is for example a command to delete a given element, such as a command to delete a temporary flight plan for the flight management function. In this case, the action-type identification field Action_ID includes the identifier of this deletion action, and the element field Element identifies the element to be deleted, such as the temporary flight plan.

Each cluster contains an identifier field DC_ID (Data Cluster IDentifier), a size field DC_B_S (Data Cluster Body Size) and a Useful Data Field DC_V (Data Cluster Value) containing the useful data of the corresponding cluster, which are not shown.

The action identification field Action_ID contains an identifier of a requested action type. The type of action is for example a consultation request, a change request, a computation request, a creation request, an activation request, or a publication. One skilled in the art will then understand that, when the type of action is a request, it corresponds to an avionics command, this request then being contained in a message sent by the receiving device 20 to the avionics device 18, said that the latter performs the avionics command associated with the request.

When the generated message is the usage domain message 36, the latter is sent by the avionics device 18 to the receiving device 20, and the associated action, contained in the action type identification field Action_ID of said usage domain message 36, is a publication (publish).

The element field Element has a structure identical to that of the cluster DC, described above, and then contains an identifier field Element_ID (Element IDentifier), a size field Element_B_S (Element Body Size), and a useful data field Element_V (Element Value) containing the useful data of the element, not shown.

Such a structure of the usage domain message 36 then allows simple sending of the various aforementioned information that may be contained in the usage domain message 36.

As an example, the list of available avionics command(s) is provided avionics function by avionics function, and for each avionics function associated with a respective Element field, the clusters following the element and associated with that element, or avionics function, are value range clusters or unavailability clusters.

Each value range cluster is associated with a respective avionics command, and contains an identifier of said avionics command and, for each parameter associated with said avionics command for which an authorized value range is to be specified, said authorized value range.

As an optional addition, this identification information of the avionics command and the associated parameter(s), as well as the authorized value range(s), are generated within the useful data field DC_V of the value range cluster, while respecting the aforementioned grammar in particular with the Action_ID and DC_ID fields. If applicable, the useful data field DC_V for example contains a table where each row corresponds to a respective avionics command. Each row of this table included in the field DC_V then comprises an Action_ID identifying the action associated with the command, a DC_ID identifying said avionics command, the number of parameters for which a range of authorized value(s) is to be specified, and for each affected parameter, an identifier of said parameter, followed by one or several data defining the range of authorized value(s) for said parameter, for example a datum indicating the type of value range and data respectively indicating the minimum value and the maximum value of said range of value(s). The aforementioned information, comprised in each row associated with an avionics command, then typically corresponds to respective columns of the table included in the DC_V field.

One skilled in the art will then understand that when a value range cluster is contained in the usage domain message 36 for a respective avionics command, this means that it is an available avionics command. In other words, according to this example, the list of available avionics command(s) for a respective element of the avionics function corresponds to the list of commands identified via the set of value range cluster(s) contained in the usage domain message 36 for the corresponding element, Element.

Each unavailability cluster is also associated with a respective avionics command, and contains an identifier of said avionics command and the unavailability status, also called unavailability state. As an optional addition, each unavailability cluster further contains the unavailability pattern for said avionics command with the unavailability status.

As an optional addition, this identification information of the avionics command and unavailability status are generated within the useful data field DC_V of the unavailability cluster, while respecting the aforementioned grammar in particular with the Action_ID and DC_ID fields. If applicable and similarly to the value range cluster, the useful data field DC_V of the unavailability cluster for example contains a table where each row corresponds to a respective avionics command, each row comprising an Action_ID identifying the action associated with the command, a DC_ID identifying said avionics command, and an unavailability indicator of said command, or even an additional datum specifying the pattern for unavailability.

The generating module 40 is configured to generate the usage domain message 36 containing the list of avionics command(s) available for the corresponding avionics function.

As an optional addition, the generating module 40 is configured, in response to a data provision request sent by the receiving electronic device 20, to generate an acknowledgment message containing a minimum condition for provision of the requested data, the requested data being available for the receiving device 20 in another data message received from the avionics device 18 once the minimal provision condition is verified.

The minimum provision condition is chosen from among the group consisting of: a minimum moment in time and a minimum value of an indicator.

Figure 4:
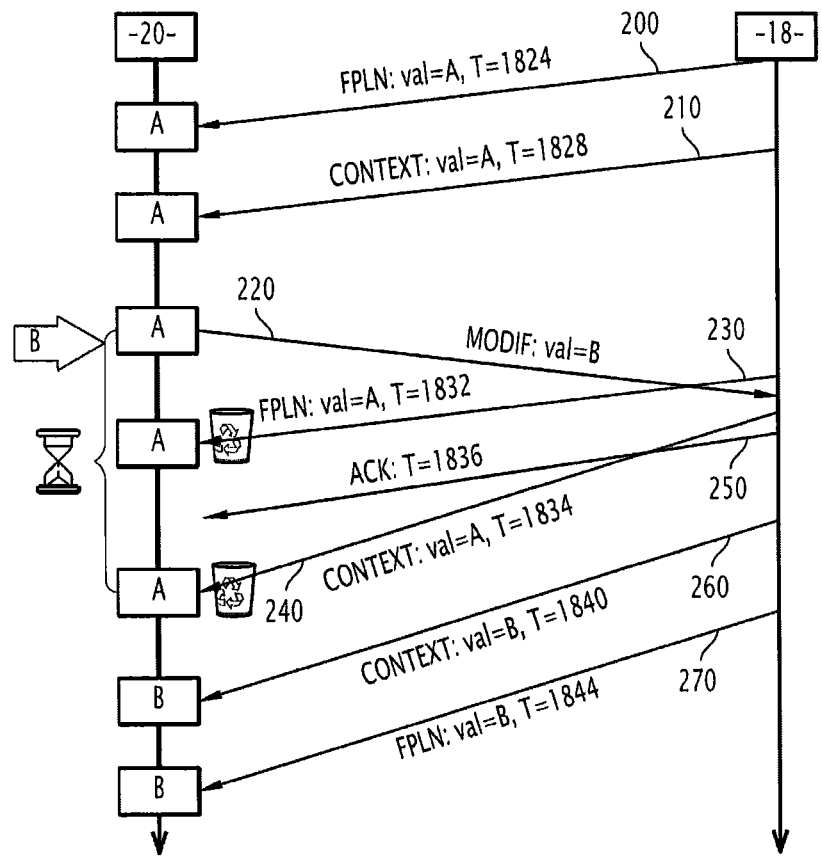
FIG. 4 is a chronogram with the sending of successive messages between the avionics device and an electronic receiving device, illustrating the implementation of an acknowledgement with a minimum condition for provision of the requested data.

In the example of FIG. 4, as will be described in more detail hereinafter, the minimum provision condition is a minimum moment in time, i.e., the moment in time corresponding to T=1836.

The sending module 46 is in particular configured to send the usage domain message 36 to the receiving device(s) 20, to display the availability of only the command(s) included in said list.

The subscription management module 48 is configured, in response to a subscription request sent by the receiving device 20, to regularly send the receiving device 20 data packets corresponding to a list of requested packet(s).

Regularly sending for example means sending after each update, and the subscription management module 48 is then configured, following each update of a packet of said list, to send the receiving device 20 the updated data packet.

Alternatively or additionally, regular sending means periodic or pseudo-periodic sending, and the subscription management module 48 is then configured, during a predefined time period, to send—at least once—each data packet from the list to the receiving device 20.

Figure 2:
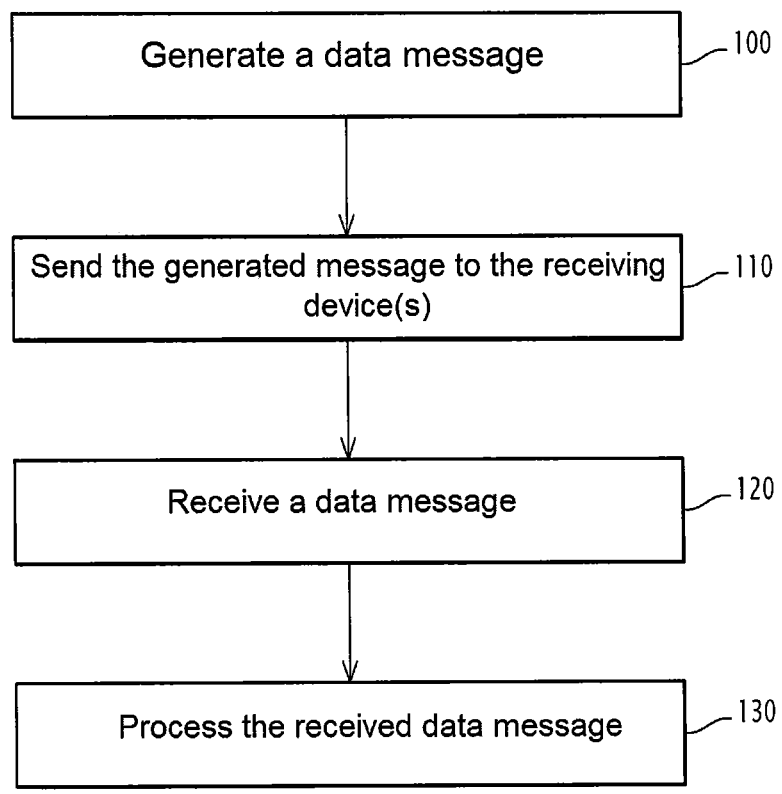
FIG. 2 is a flowchart of a data transmission within the communication system of FIG. 1, with the implementation of a sending method according to the invention, then a receiving method according to the invention.

The operation of the communication system 10 according to the invention will now be explained using FIG. 2, showing a flowchart of a data transmission method within the communication system 10 from an avionics sending device 18 to receiving device(s) 20 via the avionics communication network 14.

During an initial step 100, the avionics sending device 18 generates, via its generating module 40, one or several data messages, in particular the usage domain message 36.

According to the invention, the usage domain message 36 contains the list of avionics command(s) available for the corresponding avionics function, implemented by the sending avionics device 18.

Optionally and additionally, the usage domain message 36 further contains the range of authorized value(s) for a parameter associated with an available avionics command.

Also additionally, the usage domain message 36 further contains the unavailability status for an avionics command unavailable for the corresponding avionics function. The usage domain message 36 preferably also contains the unavailability pattern for said unavailable avionics command.

The usage domain message 36 for example has the structure as previously described in light of FIG. 3.

The avionics sending device 18 next sends, in the following step 110 and via its sending module 46, the generated data message(s), in particular the usage domain message 36, on the avionics communication network 14 to the receiving device(s) 20.

During step 120, each receiving device 20 receives, via the avionics communication network 14 and its receiving module 50, the data message(s) sent to it, in particular the usage domain message 36.

Each receiving device 20 having received at least one message then processes, during the following step 130 and via its processing module 52, the received message(s), in particular the usage domain message 36.

During the processing step 130, the processing module 52 then controls the display of the availability of the only command(s) included in said list contained in the received usage domain message 36, this availability being displayed on the display screen 27.

FIG. 4 shows the implementation, optionally and additionally, of an acknowledgment with a minimum availability condition of the requested data.

The avionics sending device 18 sends, at moment in time T=1824, a flight plan message FPLN with a value A, as shown by arrow 200, then sends a context message CONTEXT with value A at moment in time T=1828 (arrow 210). The flight plan message FPLN is a periodic message, and the data contained in said message are periodic data, the notion of periodic data being defined in more detail hereinafter.

The receiving device 20 wishes to change the value A and replace it with the value B, as shown by the arrow 'B', and then sends the avionics device 18 a data provision request, here such as a change request MODIF to account for the value B, i.e., to change the value A to the value B, as shown by the arrow 220.

In the meanwhile, the avionics sending device 18 has sent, at moment in time T=1832, a new flight plan message FPLN with value A (arrow 230), followed by a new context message CONTEXT still with this value A, at moment in time T=1834 (arrow 240).

In response to the data provision request MODIF sent by the receiving device 20, the avionics device 18 generates, via its generating module 40, an acknowledgment message ACK (arrow 250) containing a minimum provision condition for the requested data. The requested data will therefore be available for the receiving device 20 in another data message received from the avionics device 18 once the minimal provision condition will be verified.

In this example of FIG. 4, the minimum provision condition is a minimum moment in time, i.e., the moment in time corresponding to T=1836.

Alternatively, the minimum provision condition is a minimum value of a predefined indicator.

When the receiving device 20 receives the last FPLN and CONTEXT messages sent respectively at moments T=1832 and T=1834, it automatically knows that these messages still contain the value A, given that the minimum provision condition is not yet met, the minimum moment in time T=1836 not yet being reached. The receiving device 20 then decides to ignore these last received FPLN and CONTEXT messages, as symbolized by the trashcan in FIG. 4.

The avionics sending device 18 next sends, at moment in time T=1840, a new context message CONTEXT with value B (arrow 260), followed by a new flight plan message FPLN with value B at moment in time T=1844 (arrow 270).

Given that the moments in time associated with these last two messages CONTEXT and FPLN, namely respectively T=1840 and T=1844, are this time greater than the minimum moment in time T=1836, i.e., the minimum provision condition is now met, the receiving device 20 simply deduces from this that these last two messages CONTEXT and FPLN, received at moments T=1840 and T=1844, contain the requested value B.

This acknowledgement with minimum provision condition of the requested data then allows an easy guarantee of coherence of the contexts in the receiving devices 20, each receiving device knowing, in other words, which context or periodic data version it should expect.

In addition, to send data between the sending device 18 and the receiving device(s) 20, different transmission patterns are considered.

A multicast publication pattern is provided for generic data sending, from one sending device 18 to all of the receiving devices 20 connected to the avionics communication network 14. This sending in multicast mode is done on event, periodically, or on request. For example, in the case of an interface between a flight management system and a display, sending in multicast mode must be triggered upon an event of the sending device 18 to keep a display up-to-date, and is optionally completed by periodic sending to monitor a potential transmission loss.

A unicast pattern is provided for notification from a sending device 18 to a receiving device 20, this pattern also being called notification pattern. This allows a sending device 18 to send information in a unitary manner, i.e., nonrecurring, to a particular receiving device 20. The notification pattern makes it possible to limit the use of the avionics communication network 14 to what is strictly necessary.

A unicast pattern is provided for a request from a receiving device 20 to a sending device 18, this pattern also being called request pattern. In this case, the request will be followed by an acknowledgment from the sending device 18 to inform the receiving device 20 that its request has been taken into account.

A two-way unicast subscription/response pattern is a combination of a request pattern, namely a subscription request, followed by its acknowledgment, which will automatically trigger, in the sending device 18, a notification pattern for the clusters to which the receiving device 20 has subscribed. The sending of the subscription is done on event, periodically, or on request. For example, in the case of an interface between a flight management system and a display, the sending of the subscription is done on an event of the sending device 18, following the reception of the subscription request, then upon change of the context of the sending device 18, to maintain good reactivity. In this example, the sending of the subscription is optionally completed by a periodic sending to monitor any loss of transmission.

The data sent by the avionics device 18 are for example periodic data. Periodic data refer to data necessary either for a first level display (to a final user) of the state of an avionics device 18, independently of the type of display (text or graphic), and therefore the type of receiving device 20, or an interpretation of the first level state of an avionics device 18 by another avionics device 18.

When the avionics device 18 is a flight management system (FMS), the periodic data are for example trajectory data to be followed, location data or guide data. When the avionics device 18 is a radio management system (RMS), the periodic data for example relate to a tuning state of the radios, a failure declaration. When the avionics device 18 is a terrain alert and warning system (TAWS), the periodic data are for example terrain collision prediction data.

The periodic data must be sent regularly by the avionics device 18, the number of receiving devices 20 listening to the data for example being unknown by the avionics device 18.

The transmission pattern preferably used for the transmission of the periodic data is then the multicast mode publication pattern, which makes it possible to provide the receiving device 20 with the update of the state of the sending device 18.

Additionally, the data sent by the avionics device 18 are contextual data. Contextual data refer to the set of data that may be displayed relative to a capacity of the sending device 18. The contextual data do not, however, comprise data related to a purely graphic display, such as graphic segments. The contextual data are broadcast by the sending device 18 upon request by the receiving device 20.

When the avionics device 18 is a flight management system (FMS), the contextual data for example relate to default/inserted/computed states of the parameters of a leg, parameters for defining a hippodrome or holding circuit in approach phase (holding pattern), or a direct flight to a destination (direct-to), parameters for defining a point or a pilot route. When the avionics device 18 is a radio management system (RMS), the contextual data for example relate to test results of the radios.

The contextual data and the periodic data form two sets that may partially overlap. As an example, when the avionics device 18 is a flight management system (FMS), the names of the departure and arrival procedures are usable by permanent display, such as on a timeline, and then correspond to periodic data, as well as contextually to select the departure and arrival procedures, and then correspond to contextual data.

Since the transmission of contextual data is subject to major real-time constraints, the volume of contextual data necessary at each moment must be limited, the demand of the receiving device 20 must therefore relate both to the elements on which it wishes for information, as well as the functional packet(s) of information of interest to it.

The transmission pattern preferably used to transmit the contextual data is then the two-way unicast subscription/response pattern, in order to manage both the demand from the receiving device 20 to the avionics device 18 and the response information sent by the avionics device 18 to the receiving device 20.

Additionally, the avionics device 18 manages, via its subscription management module 48, any subscription request sent by a receiving device, by sending, in response to such a subscription request, regularly to the receiving device 20, the data packets corresponding to the list of requested packet(s), included in the subscription request.

As an example of subscription/response sequence, the receiving device 20 sends its subscription request with the complete list of requested elements/packets.

Next, via its subscription management module 48, the avionics device 18 acknowledges the receipt of this request and closes the previous subscription for this receiving device 20 (for all the packets) and replaces it with the new subscription request associated with the received request.

The avionics device 18 then sends, once possible and via its subscription module 48 and its transmission module 46, all of the parameters defined in the packets to the receiving device 20.

As long as the subscription is not changed, the avionics device 18 again sends the parameters of the elements/packets upon each update, and otherwise periodically, with a time period for example between 1 and 5 seconds. This periodic sending makes it possible to reduce the risk of a permanent error.

The time period is for example set by the avionics device 18 according to the packets. Alternatively, the time period is predefined.

Thus, the avionics device 18 according to the invention makes it possible to improve the coupling with the receiving device(s) 20, each receiving device 20 needing to know whether the command is available before displaying it to propose to the user to select it if he wishes.

This aim is further achieved while not requiring the receiving device 20 to include a logic related to a version of the avionics sending device 18, which would have limited the interoperability.

The sending of the usage domain message 36 is done only during the initialization of the exchange of data between the avionics device 18 and the corresponding receiving device 20, and/or is done dynamically. The dynamic sending of the usage domain message 36 is for example done when the receiving device 20 subscribes to a context.

Furthermore, the display of the reason why a command is not authorized, when the usage domain message 36 further includes this additional information, allows the end-user to know this non-authorization reason, to next be able to perform, as needed, the actions necessary to authorize the avionics command in question.

When the usage domain message 36 further contains a range of authorized value(s) for a parameter associated with an available avionics command, this makes it possible to cause an avionics function implemented by the avionics sending device 18 to evolve without having to change the implementation of the man-machine interface on the receiving device(s) 20 side. As an example, it is then possible to cause the flight envelope of a flight management system (FMS) to evolve without retouching the associated interactive man-machine interface; or this makes it possible to cause the size of the identifier of a radio to evolve easily.

One can thus see that the avionics device 18 and the associated sending method make it possible to improve the coupling between the avionics device 18 and the receiving device(s) 20.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. An avionics device intended to be on board an aircraft, the avionics device being configured to implement an avionics function and to control the display, by at least one receiving electronic device, of data associated with the avionics function, the avionics function including one or several avionics commands able to be displayed on the receiving device and selected by a user, the avionics device comprising:
 a generating module configured to generate a data message, and
 a sending module configured to send the generated message to the receiving device,
 wherein the generating module is configured to generate a usage domain message containing a list of avionics command(s) available for the corresponding avionics function, and
 the sending module is configured to send the usage domain message to the receiving device(s), to display the availability of only the command(s) included in said list.

2. The avionics device according to claim 1, wherein the usage domain message further contains a range of authorized value(s) for a parameter associated with an available avionics command.

3. The avionics device according to claim 1, wherein the usage domain message further contains an unavailability status for an avionics command unavailable for the corresponding avionics function.

4. The avionics device according to claim 3, wherein the usage domain message further contains an unavailability pattern for said unavailable avionics command.

5. The avionics device according to claim 1, wherein, in response to a data provision request, sent by the receiving electronic device, the generating module is configured to generate an acknowledgment message containing a minimum condition for provision of the requested data, the requested data being available for the receiving device in another data message received from the avionics device once the minimal provision condition is verified.

6. The avionics device according to claim 1, wherein the avionics device further comprises a subscription management module configured, in response to a subscription request sent by the receiving electronic device, to regularly send the receiving device one or several data packets corresponding to a list of requested packet(s), the subscription request including said list of requested packet(s).

7. The avionics device according to claim 6, wherein the subscription management module is configured, following each update of a packet of said list, to send the receiving device the updated data packet.

8. A method for sending a data message to at least one receiving electronic device, comprising:
generating a data message, and
sending the generated data message to the receiving device,
wherein the generating step including generating a usage domain message containing a list of avionics command(s) available for the corresponding avionics function,
wherein the sending step includes sending the usage domain message to the receiving device, to display the availability of the only command(s) included in said list, and
wherein the method being implemented by an avionics device intended to be located on board an aircraft, said avionics device being configured to implement an avionics function and to control the display, by the receiving electronic device, of data associated with the avionics function, the avionics function including one or several avionics commands able to be displayed by the receiving device and selected by a user.

9. A non-transitory computer-readable medium including a computer program comprising software instructions which, when executed by a computer, carry out a sending method according to claim 8.

10. An electronic receiving device configured to receive a data message from an avionics device intended to be placed on board an aircraft, comprising:

a receiving module configured to receive a message from the avionics device, and
a processing module configured to process each received message,
wherein the receiving module is configured to receive, from the avionics module, a usage domain message containing a list of avionics command(s) available for the corresponding avionics function,
wherein the processing module is configured to control the display, on a display screen, of the availability of the only command(s) included in said list contained in the received usage domain message, and
wherein said avionics device being able to implement an avionics function and to control the display, via the receiving electronic device, of data associated with the avionics function, the avionics function including one or several avionics commands able to be displayed by the receiving device and selected by a user.

11. A method for receiving a data message by a receiving electronic device from an avionics device intended to be positioned on board an aircraft, comprising:
receiving a message from the avionics device, and
processing each received message,
wherein the receiving step includes receiving a usage domain message, sent by the avionics device, the usage domain message containing a list of avionics command(s) available for the corresponding avionics function,
wherein the processing step including controlling the display, on a display screen, of the availability of the only command(s) included in said list contained in the received usage domain message, and
wherein the avionics device being able to implement an avionics function and to control the display, via the receiving electronic device, of data associated with the avionics function, the avionics function including one or several avionics commands able to be displayed by the receiving device and selected by a user.

12. A non-transitory computer-readable medium including a computer program comprising software instructions which, when executed by a computer, carry out a receiving method according to claim 11.

* * * * *